March 3, 1936.  W. B. CLIFFORD ET AL  2,032,563
BELLOWS ASSEMBLY
Filed Jan. 8, 1935
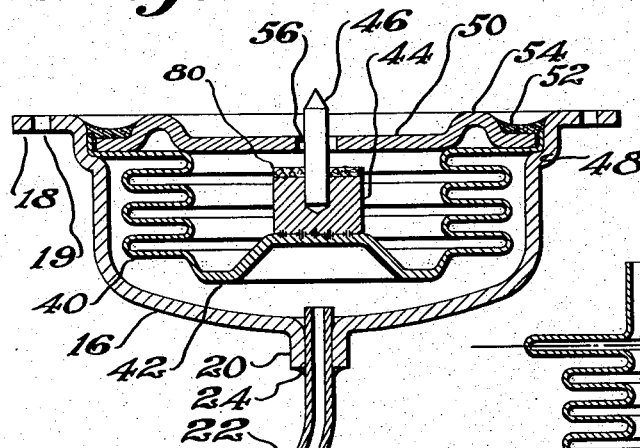
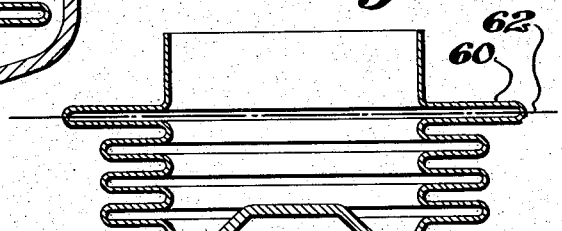
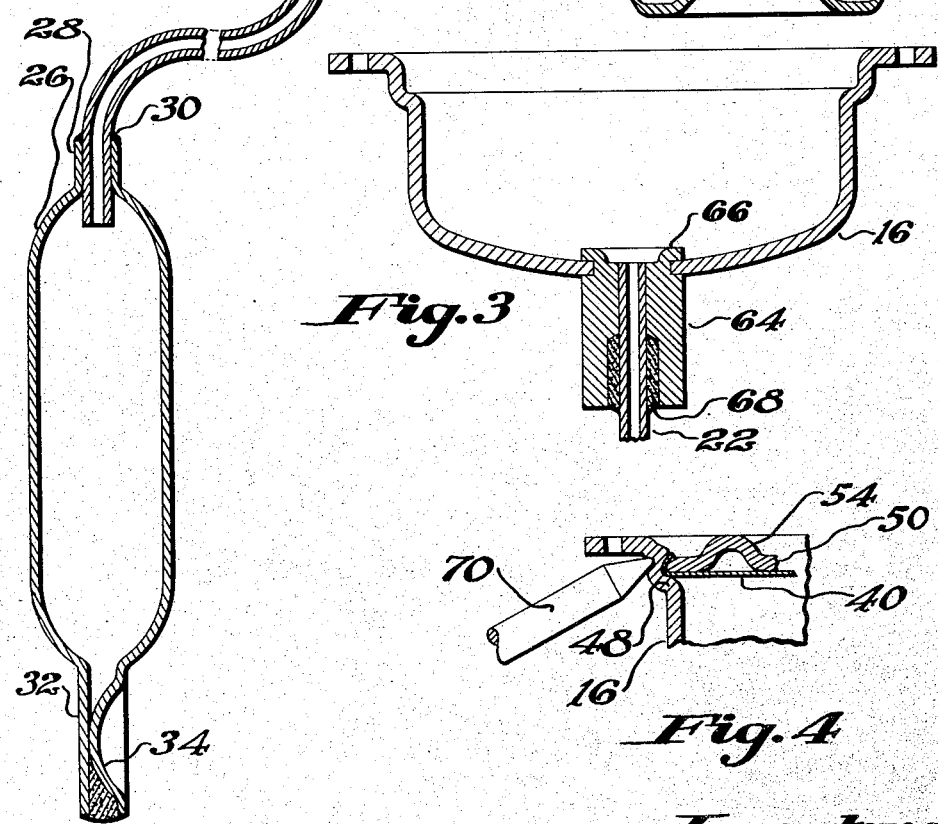
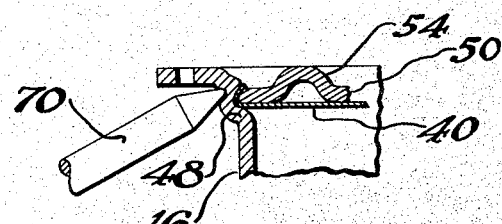
Witness
Paul F. Bryant
Inventors
Walter B. Clifford
John E. Woods Patented Mar. 3, 1936

2,032,563

UNITED STATES PATENT OFFICE 2,032,563

BELLOWS ASSEMBLY

Walter B. Clifford, Boston, and John E. Woods, Newtonville, Mass., assignors to Clifford Manufacturing Company, Boston, Mass., a corporation of Delaware Application January 8, 1935, Serial No. 874

3 Claims. (Cl. 297—3)

The present invention relates to a bellows assembly having particular utility in connection with the remote control of electric switches, valves and the like.

The purpose and object of the invention is to provide a simple and efficient form of such an assembly with the usual remote bulb or capillary, and enclosed in a housing or casing by which it may be conveniently attached to the wall of the enclosure surrounding the switch or valve intended to be operated thereby.

With this and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents a section in elevation of the remote control unit adapted for attachment to a switch housing; Fig. 2 is a detail illustrating a section of the bellows unit before assembly within the unit; Fig. 3 illustrates a modified method of sealing the capillary to the housing enclosing the bellows unit; and Fig. 4 is a detail illustrating the method of mechanically distorting the housing to lock the bellows unit and supporting plate therein.

Referring particularly to the illustrated embodiment of the invention, the unit comprises a drawn cupped housing 16, having a peripheral attaching flange 18 provided with openings 19 for attachment to a support enclosing a switch, valve or the like. This housing, as indicated in Fig. 1, is necked down at 20 to receive the end of a length of capillary 22 which may be sealed therein by a silver solder band 24. The capillary is of sufficient length to extend from the control member to the chamber under control, and may, if so desired, be provided at its outer end with an enlarged bulb 26 swedged to a reduced diameter at 28 to receive the end of the capillary which is soldered at 30, and reduced by swedging at the opposite end to provide an extending neck portion 32 which is sealed off after filling of the unit by squeezing in the general form indicated at 34.

The cupped housing 16 is provided with a bellows 40 formed with an integrally closed end 42 and having mounted thereon internally a head 44 which carries an operating pin 46. This head may be secured to the head 42 of the bellows by welding or soldering, and is mounted thereon without piercing the closed end of the bellows.

The upper or open end of the bellows unit is provided with a radial flange which is received within an outwardly extending circumferential shoulder 48 formed in the housing and is locked in place by a locking member in the form of a circular ring or ring 50 seating within the shoulder and engaging the extended flange on the bellows to hold it in contact with the recess 48. The parts are hermetically sealed, as indicated in Fig. 1, by a soldered joint 52. The cover 50 may be and preferably is provided with a circumferential rib 54, which is finished at its upper surface to lie in the plane of the attaching flange, this rib bearing against the supporting surface and relieving the soldered joint from strains due to pressure within the unit. The operating pin 46 plays through an enlarged opening 56 formed in the plate, which does not, however, normally engage with the pin or in any way constrict its free movement. The pin, as will be evident to those skilled in the art, is adapted to contact directly with the movable portion of a switch or valve. For example, in utilizing this mechanism for the operation of a refrigerator switch, the cupped housing is attached directly to the switch housing, and the movable pin caused to engage with one element of a toggle switch or the like to cause its operation in accordance with temperature changes.

The interior of the unit, that is to say, the capillary, bulb and space between the housing and bellows communicating with the capillary, may be filled with suitable thermostatic fluid such as sulphur dioxide after the removal of air therefrom. Subsequently the entire unit is sealed, and when the bulb is placed in the compartment to be refrigerated, the bellows is caused to expand and contract in accordance with temperature changes. Obviously, the bulb may be dispensed with if the capillary has sufficient capacity for fluid, and the remote end of the capillary itself pinched off after filling of the capillary and the interior of the housing with thermostatic fluid.

Upon reference to Fig. 2, it will be observed that the bellows unit is provided with a plurality of folds of uniform size and with an end fold 60 of larger diameter. The diameter of the end fold is sufficient to provide a radial flange of the necessary size after formation of the bellows and cutting of the end fold approximately on the line 62, leaving an extending radial flange which may be trued up and slightly curved at the outer edge if so desired. Subsequent to the mounting and assembly of the inner head and valve pin, the bellows unit together with the ring 50 is assembled within the housing and soldered in place. The resultant unit is simple, compact and affords an ideal assembly for the operation of mechanism of this character.

As an alternative to the fastening of the capillary in the manner shown, the housing may be provided with a fitting 64 recessed to go through an opening in the housing spun over at 66, the end of the capillary 22 being inserted in the bore of the recess and sealed by a solder thimble at 68, all as indicated in Fig. 3.

In order to secure the ribbed disk or ring 50 within the housing and mechanically lock the bellows unit at the rim it may be desirable to indent the housing at a plurality of points, as indicated in Fig. 4. This indenting can be performed with a tool 70 which projects from the wall of the housing inwardly above the plate to lock the plate and the arm of the bellows unit in the circumferential recess 48.

On referring particularly to Fig. 1, it will be observed that the head 44 which carries the operating pin 46 is provided with a sealing disk ring 80 of non-metallic material. This disk is intended to contact with the under face of the member 50 and seal the space within the bellows by virtue of such contact. The disk may be preferably made of treated paper or perhaps rubber or similar materials which are capable of withstanding temperatures to which the unit is subjected, and which are compressible to seal the opening 56 against the entrance of liquids either employed in washing, tinning or soldering. After complete assembly the unit is filled with thermostatic fluid through the reduced end 32 of the bulb 26, as will be evident to those skilled in the art. This entrance with the space encompassed by the bulb and capillary and the closed space between the housing 16 and the exterior of the bellows is completely filled with thermostatic fluid. After such filling the reduced end of the bulb is pinched off at 34 and preferably closed beyond the pinch-off by a solder button.

With the ordinary thermostatic fluids which are employed, expansion of the vapor at room temperatures causes the bellows folds to be compressed until the disk 80 contacts with the opposing face of the disk 50. This contact of the two members serves to limit the movement of the bellows due to expansion of the fluid, and serves as an effective stop for this purpose. Movement in the opposite direction may be confined by contact of the projecting closed end of the bellows with the bottom of the cupped housing 16. It will thus be evident that the disk 50 or its equivalent in combination with the head 44 provides an effective and simple form of stop for limiting outward movements of the bellows due to expansion. It will be understood from the foregoing and from examination of the drawing that the general circular and disk-like cover 50, due to its conformation, supports the radial attaching flange of the bellows against pressure at two spaced points and that this cover member has in effect a circular portion seating above and reinforcing the flange and a transversely extending portion which serves as a stop to limit outward movement of the free end of the bellows.

After assembly and filling of the unit it is desirable that it be tinned or plated in its entirety, and this is commonly accomplished by dipping the entire unit in a plating bath. It is obviously preferable that fluid from the plating bath be not allowed to enter the space within the bellows, which could otherwise occur through the opening 56. With the present construction expansion of the thermostatic fluid causes a tight sealing between the compressible disk 80 and the member 50 to seal entrance to the space within the bellows so that the entire unit may be safely immersed in a plating bath at room temperatures or above without liability of the fluid from the bath seeping into the interior. Furthermore, the disk is of such a character that it will withstand whatever temperatures the unit may be subjected to in plating, soldering or other operations.

What is claimed is:

1. A unit of the class described comprising a cup-like housing, a bellows having a movable end wall sealed at its open end adjacent the open end of the housing to encompass an expansive and contractible annular space between the housing and bellows, a disk-like cover closing the open end of the housing and bellows and provided with an opening therethrough for the passage of an operating member, the cover limiting outward movement of the end wall under the influence of pressure in the annular space, and means for sealing the space encompassed by the bellows and cover when the end wall has reached the outer limit of its movement determined by the cover.

2. A unit of the class described comprising a cup-like housing, bellows received within the housing and connected therewith at the open end, thermostatic fluid in the annular space between the housing and bellows serving to expansibly move the free end of the bellows outwardly, an operating member mounted upon the movable free end of the bellows, a circular cover member closing the open end of the housing and having an opening through which the operating member moves, and a compressible sealing ring engaging the cover about the opening to seal the interior of the bellows upon outward movement of the operating member to a limit determined by the cover.

3. A unit of the class described comprising a cup-like housing, a bellows unit received within the housing and connected therewith at the open end of the housing to seal the annular space between the exterior of the bellows and housing and to permit movement of the opposite free end of the bellows upon changes in pressure within the annular space, an operating member mounted upon the movable free end of the bellows, a disk-like cover closing the open end of the housing beyond the bellows and having an opening through which the operating member moves, and means for limiting the outward movement of the free end of the bellows and operating member under the influence of pressure within the annular space and for sealing the opening in the cover giving access to the interior of the bellows when the free end is moved outwardly under the influence of pressure to its approximate limit.

WALTER B. CLIFFORD.
JOHN E. WOODS.